United States Patent [19]

Someya

[11] Patent Number: 4,687,308
[45] Date of Patent: Aug. 18, 1987

[54] INFORMATION SETTING DEVICE FOR CAMERA

[75] Inventor: Hiromi Someya, Kanagawa, Japan

[73] Assignee: Canon Kabushiki Kaisha, Tokyo, Japan

[21] Appl. No.: 848,813

[22] Filed: Apr. 4, 1986

[30] Foreign Application Priority Data

Apr. 9, 1985 [JP] Japan .............................. 60-053200[U]

[51] Int. Cl.⁴ ........................ G03B 29/00; G03B 17/00
[52] U.S. Cl. .................................... 354/82; 354/289.1
[58] Field of Search ........... 354/81, 82, 289.1, 289.11, 354/289.12

[56] References Cited

U.S. PATENT DOCUMENTS 4,037,240 7/1977 Ando et al. ............................ 354/82

Primary Examiner—Russell E. Adams
Attorney, Agent, or Firm—Toren, McGeady & Associates

[57] ABSTRACT

In the camera having a hold grip in the projecting form out of the front corner of one side of the body thereof and a photographic information display positioned on the same side of the finder housing as that of the grip, a release button is put on the top of the grip, and further an operating member for an information setting device takes its place between the release button and the information display.

6 Claims, 7 Drawing Figures

INFORMATION SETTING DEVICE FOR CAMERA

BACKGROUND OF THE INVENTION

1. Field of the Invention

This invention relates to a device for setting photographic informations in a camera.

2. Description of the Prior Art

Recently, as the application of electronics to cameras has progressed, a camera having an increased number of exposure modes such as shutter speed priority AE, aperture priority AE and programmed AEs and also an increased number of light metering modes such as a spot-metering mode and an average-metering mode has been proposed and is available in the market. For setting a desired value of the shutter speed or aperture in the selected one of the exposure modes and the value of sensitivity of the used film, if the camera was provided with respective individual operating members such as the shutter dial, film speed dial, and so on, it would have been very difficult to handle such a camera.

So, the mode selector switch was made to cooperate with a preset value input switch for correcting the initial value of an exposure factor, thereby all the desired values of the different exposure factors could be preset by the common operating member for the correction switch. It has also been proposed to use a common liquid crystal display of increased size for indicating what exposure mode has been selected and what values have been preset over all exposure factors.

FIG. 1 illustrates an example of the prior known operating member for the above-described correction switch wherein it has the form of two push buttons, or UP botton 104 and DOWN button 106 positioned on the same side of the finder housing as that above the film take-up spool chamber. For selecting a desired one of the exposure modes, the operator needs first to depress an exposure mode selection control button 100 above the film cartridge chamber by his left hand's index finger, and then, while depressing it, to depress either one of the UP and DOWN buttons 104 and 106 by his right hand's index finger until the desired mode appears in the display 110. Then, to alter the initial value of shutter speed or aperture in the shutter speed priority or aperture priority exposure mode respectively, the operator needs, while removing the left index finder from the botton 100, to depress either one of the UP and DOWN buttons 104 and 106 until a desired value appears in the display 110. If the operator does this setting while holding the camera, his right hand index finger touching the button 104, 106 will unavoidably shuts out his eyes from looking at the display 110. Besides this, because of that finger is floating, the right hand becomes unable to grasp the camera steadily enought. So, the left hand has to play main role in holding the camera. For note, to preset the value of film speed, a botton 102 is depressed along with either of the buttons 104 and 106.

Another example of the prior known operating member is shown in FIG. 2, using rotary dials 206 and 210 for setting the film sensitivity and shutter speed respectively with the help of display panels 204 and 208. While a shutter botton 200 is depressed to the first stroke and maintained there, when these dials are turned to UP side, the preset values increase, and when to DOWN side, they decrease. And, to do this while holding the camera, the operator needs to use the ball of the thumb of his right hand to rub the knurled periphery of the dial 206 or 210 while keeping its index finger to maintain the release button 200 at the first stroke, until the expected value appears in the display 204 or 208. Though, in the camera of FIG. 2, the displays 204 and 208 are not shut off, not only the index finger but also the thumb must be taken out of holding the camera when the setting is carried out. Since the steady holding of the camera is insured by the thumb abutting against the back of the camera as opposed to the pressure of the other fingers except the index one on the grip 202, the use of the thumb in operating the dials 206 and 210 gives rise to a problem of extremely lowering the steadiness of holding the camera.

For note, the structure using a rotary dial as the aforesaid digital correction switch is proposed in the Japanese Laid-Open Patent Application No. SHO 58-211902 (U.S. Pat. Ser. No. 669,591 assigned to the assignee of the present invention). In this proposal, as the digital correction switch, there is provided a rotatable setting dial, and it is revealed that an UP correction output and a DOWN correction output can be operated by the direction of rotation of this dial. Because this dial is, however, is positioned farther than the release button away from the right hand holding the camera, when to alter the preset value, it is necessary to displace the right hand more or less from the fit position. Similarly to the first two examples of the prior art, the right hand can no longer steadily grasp the camera, and the left hand has to help holding it.

SUMMARY OF THE INVENTION

The present invention has aimed at a capability for the operator to set a camera without the necessity of changing the holding attitude of his hand from the fit position on the grip of the camera, and its object is to provide an arrangement and construction of an operating member of the rotary dial form for an information setting device.

Other objects of the invention will become apparent from the following detailed description of an embodiment thereof.

DETAILED DESCRIPTION OF THE PREFERRED EMBODIMENTS

Figure 1:
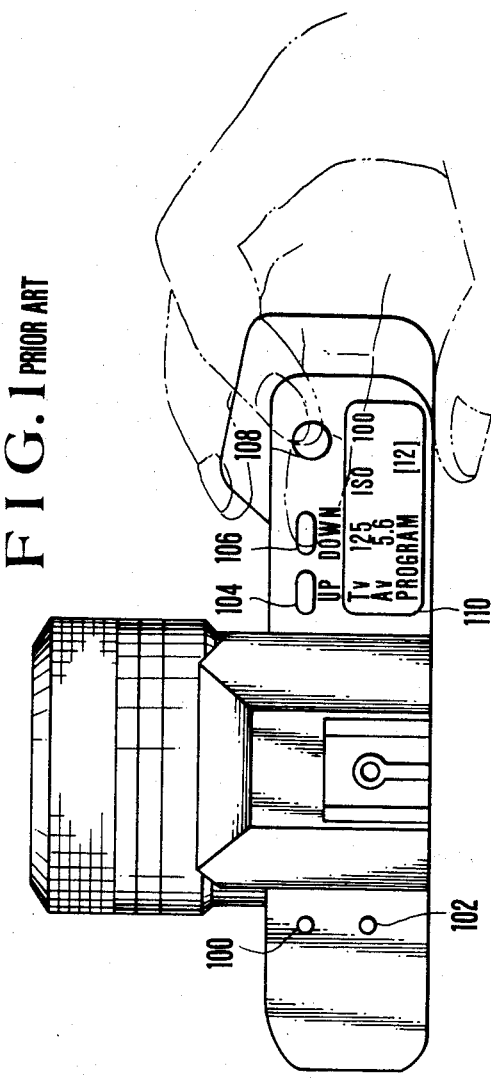
FIGS. 1 and 2 are top views of the cameras employing the prior known information setting devices.
Figure 2:
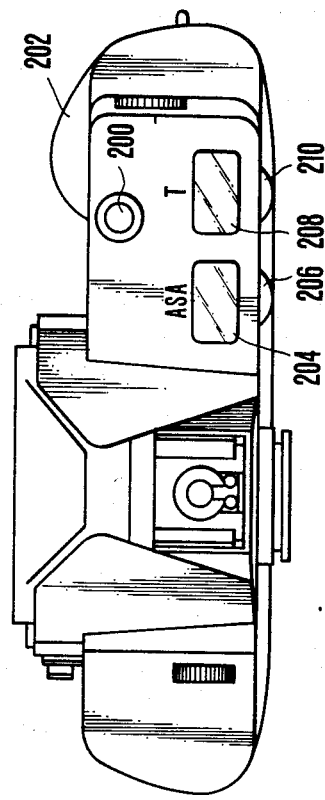
Figure 3:
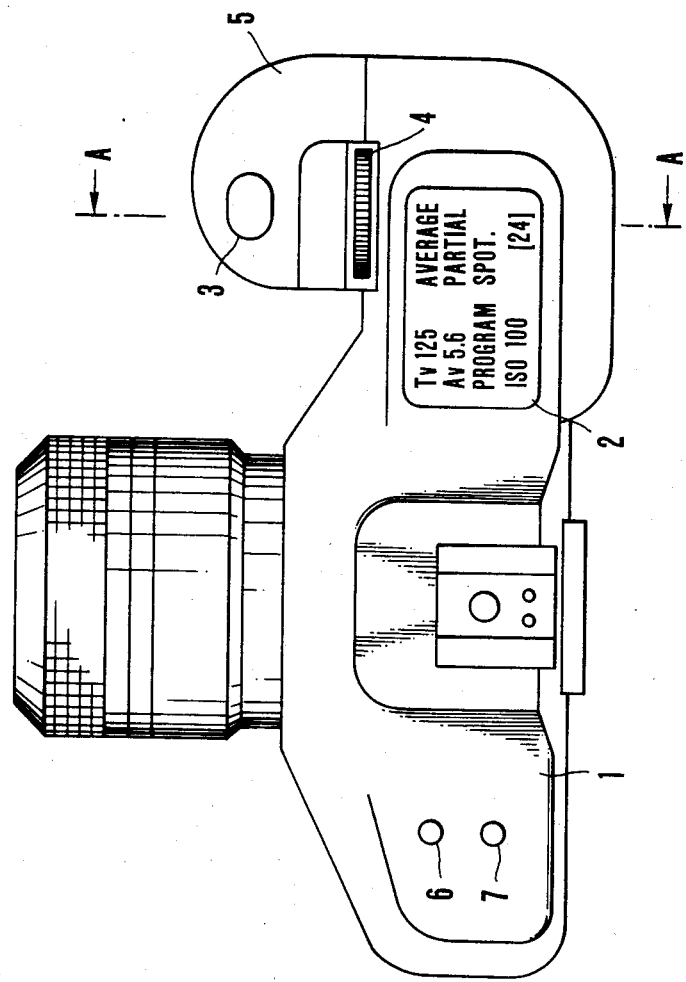
FIG. 3 is a top view of a camera employing one form of the information setting device of the invention.

In FIG. 3 there is shown an embodiment of the invention in a camera having a top panel 1 with a liquid crystal or like display 2 positioned in the panel 1 at an area just above the take-up spool chamber. A release button 3 is positioned on the top of a grip cap 5. A dial 4 as the operating member for setting informations is supported on the grip 5. An exposure mode selection control button 6 and a light metering mode selectrion control button 7 are positioned on the left hadn side in the top panel 1.

Figure 4:
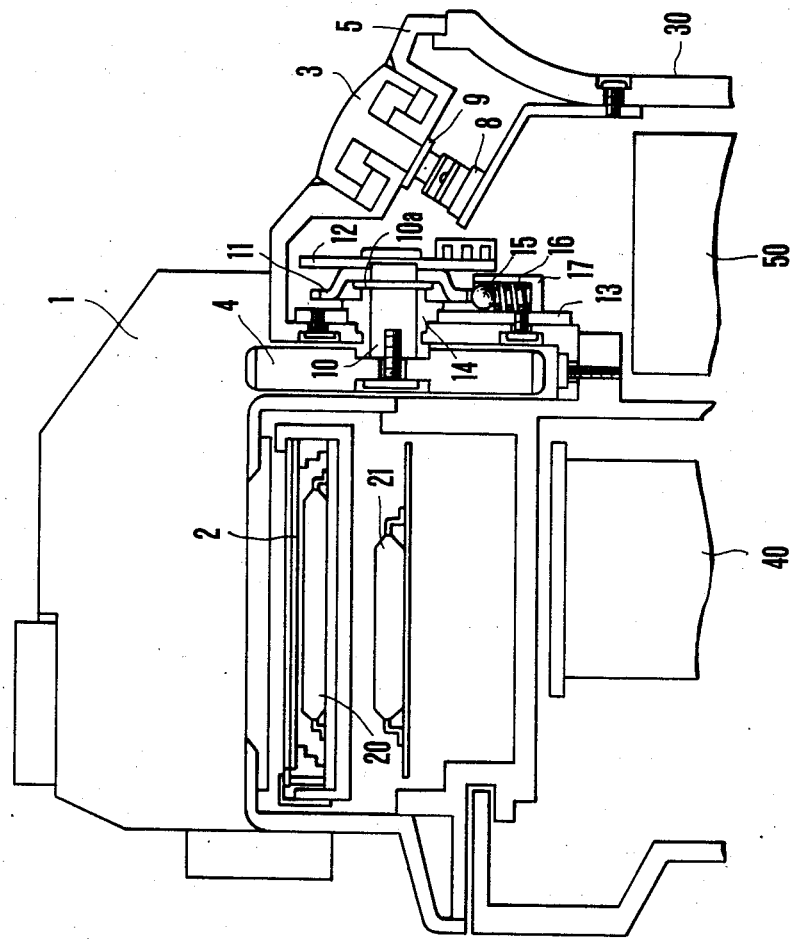
FIG. 4 is a sectional view taken along line A—A of FIG. 3.
Figure 5:
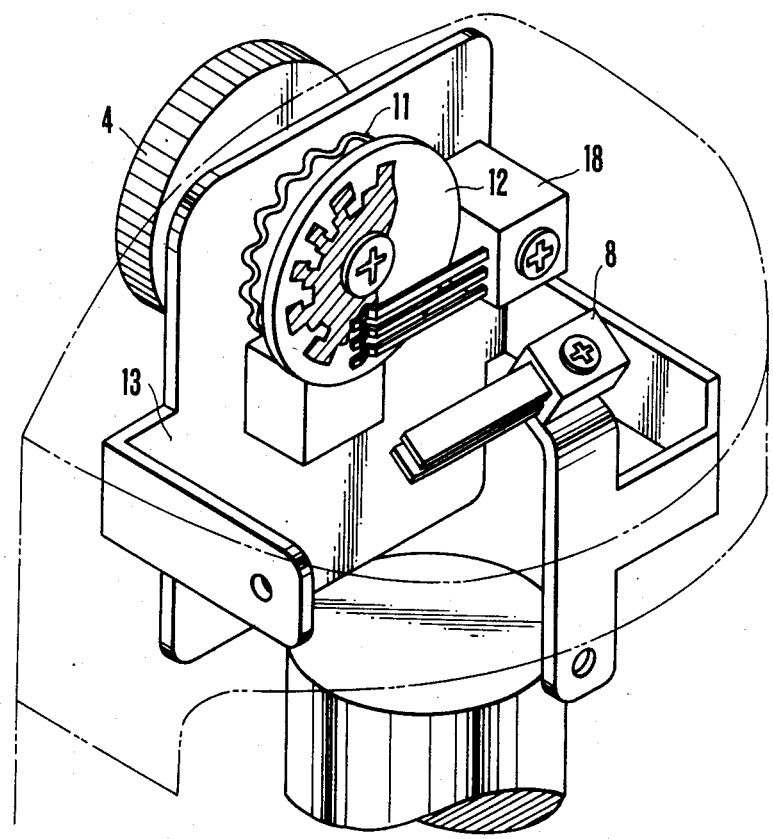
FIG. 5 is a perspective view of the dial of FIG. 3 with the associated parts therewith.

The features of the invention are next described by reference also to FIGS. 4 and 5. The release button 3 is snugly fitted in a recess formed in the inclined top surface of the grip cap 5 and movable in a thrust direction. The opposite end of a shaft of the button 3 engages a leaf switch 8 fixedly secured to a grip body 30 by a screw fastener. The left spring of the switch 8 urges the shaft in the reversed direction to that in which the botton 3 is pushed down. A washer 9 prevents the button 3 from repelling away. By operating the release button 3 against the leaf switch 8, the leaf switch 8 is turned on to produce an electrical signal. Responsive to this signal, a control circuit (not shown) drives shutter time or lens aperture determining means. The above-described dial 4 is supported on a shaft 10 at one end thereof, the opposite end of which fixedly carries a click plate 11 and a dial substrate 12. The shaft 10 is supported on a journal bearing 14 fixedly mounted to a vertical rear wall 13 of the grip cap 5 by rivets or the like, and is restrained from movement in the thrust direction by the dial 4 and a flanged portion 10a thereof. The aforesaid click plate 11 is formed to a round shape with its outer periphery knurled. A steel ball 15 is urged by a coil spring 16 to abut against the knurled periphery of the clikc disc 11. The steel ball 15 and coil spring 16 are snugly fitted in a casing 17 in radially aligned relation to the click disc 11. Formed on the front surface of the substrate 12 is an electrically conductive pattern as shown in FIG. 5. An assembly of three contact elements 18 ride-on the pattern 12, making it possible to detect which direction, clockwise or counterclockwise, the rotation of the dial 4 takes. Also, the click disc 11 and the substrate 12 have phases so that when the steel ball 15 enters one of the valleys of the click disc 11, two of the three contacts 18 except the GND contact takes their place on an electrically insulating area. The display 2 is made of a liquid crystal cell and is able to display a plurality of photographic informations visible from the outside of the camera. 20 is an IC for driving the liquid crystal cell; and 21 is another IC for controlling the feeding. Because the details of these circuits are already known to those stilled in the art, and since they are not essential to the present invention, their illustration and description are omitted. For note, 40 is a spool positioned just below the display device 2. 50 is a battery arranged within the grip body 30.

Figure 6A:
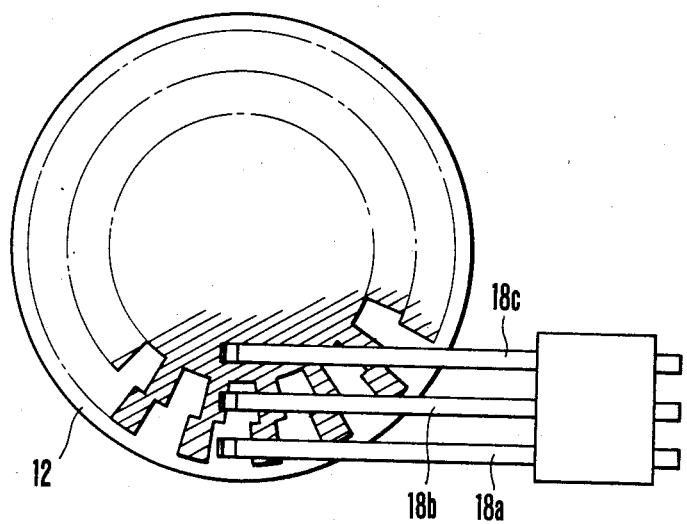
FIGS. 6(a) and 6(b) are respectively front and side elevational views of the switching mechanism having the substrate of FIG. 5.
Figure 6B:
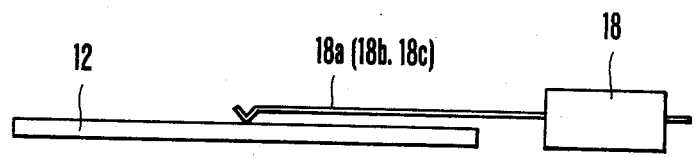

The operation is as follows: At first, when to alter the exposure mode, the exposure mode button 6 is pushed down, thereby the exposure mode is readied to be changed over. With the button 6 left pushed down, when the dial 4 is turned from valley to mount while pushing the steel ball 15 against the coil spring 16, and further from the mount to the next valley. By this movement, the individual contacts 18a, 18b and 18c of the dial contact assembly 18 are operated in such a manner that as shown in FIGS. 6(a) and 6(b), when in the clockwise direction, at first the contact 18a produces on ON signal, then the contact 18b produces an ON signal, then the contact 18a produces an OFF signal, and then the contact 18b produces an OFF signal, thus completing one cycle of operation of the contact assembly 18. These signals are supplied to an exposure mode selection circuit of known construction. Thereby, the exposure mode is changed to another mode by one cycle. By continuing this operation, the mode is altered from one to another in sequence, for example, TV priority→AV priority→Program→TV priority and so on. The display 2 also changes from TV priority to AV priority, then to Program, then to TV priority, and so on. Next, when the dail 4 is turned in the counterclockwise, as shown in FIGS. 6(a) and 6(b), the contact 18b first produces an ON signal, then the contact 18a produces an ON signal, then the contact 18b produces an OFF signal, and then the contact 18a produces an OFF signal, thus completing one cycle. Thereby the exposure mode is changed to another mode. By continuing this operation, the mode is altered in the reversed direction to that of the former case, or TV priority→Program→AV priority →TV priority, and so on. At the same time, the display alters TV priority→Program→AV priority→TV priority and so on.

Next by pushing the light metering mode button 7, the light metering mode is readied to alter. Similarly to the exposure mode, when the dial 4 is turned in the clockwise direction, the ON and OFF signals of the contacts 18a and 18b are supplied to an light metering mode selection circuit of known construction. Therefore, the mode and display are altered: Average→Partial→Spot→Average. Also, when in the counterclockwise direction, the mode and display are altered: Average→Spot→Partial→Average. For note, the circuit capable of altering the photographic informations in response to rotation of the dial is known to those skilled in the art. So the explanation of the construction of the circuit is omitted.

What is characteristic in the above-described embodiment is where to arrange the dial 4 as the operating member for the information setting device. This dial 4 is arranged in such a position that without the necessity of shifting the hand when holding the camera, its rotative operation can be carried out. That is, the release button 3 is arranged on the upper surface of the grip (grip cap 5), and the outer shape of the grip (grip body 30) is provided with such a projected shape or the like so that the tip of the index finger touches it without stress in the right hand holding state. The display device 2 is arranged on the upper cover of the camera and near the upper position of the take-up spool 40. Naturally, in this position, when holding the camera, in the state of putting the index finger on the release button 3, the display is not hidden by that index finger. And, the dial 4 is arranged between the aforesaid release button 3 and the display device 2 and has a somewhat approaching position for the palm of the right hand holding the camera. Without shifting the hand of holding it, the same index finger can rotatively operate the dial 4. Also, for the index finger to operate the dial 4, it is rather better to position the dial 4 a light nearer than the position its finger tip can just tough when stretched, because it can be operated by slightly bending the finger at the joints. So, an optimum state of operation can be obtained. Also, in this position of the dial 4, in the operation of the index finger, the fact that the display device is not hidden can be obtained as an advantage.

Also, in this embodiment, the dial 4 is set up with its plane of rotation nearly perpendicular to the horizontal plane or the surface of the upper cover 1. Therefore, the space necessary to the upper cover is no more than the area of the circumferential part as shown in FIG. 3 so that the other space on the upper surface of the camera can be effectively utilized.

Also, the reason why the upper surface of the grip cap 5 that is provided with the release button 3 is inclined is that when in camera hold, the index finger assumes an inclined position relative to the upper cover 1 of the camera. This implies that the manageability is improved.

Also, further in this embodiment, the journal bearing of the dial 4 and the click mechnism are arranged within the grip body 30, as separated from the camera body. This has made it possible to prevent bad influence of water on the electrical elements such as ICs 20 and 21 provided in the camera body, as it would otherwise enter through an opening formed in order to project the dial 4.

As has been described above, according to the invention, by providing a dial-shaped information setting operating member between the release button provided on the top of the grip and the photographic information display device, the manageability of the information setting device of the camera is extremely improved.

What is claimed is:

1. A camera having an information setting device comprised of a dial-shaped information setting operating member capable upon rotation of changing photographic informations, comprising:
   (a) a grip for hold formed to a projected shape from the front surface of one side of the camera body in an optical axis center direction;
   (b) a photographic information display device arranged on said one side of the camera body;
   (c) a release button arranged on the upper surface of said grip for hold; and
   (d) a dial-shaped information setting operating member arranged between said release button and said photographic information display device.

2. A camera according to claim 1, wherein said dial-shaped information setting operating member is rotatably supported, and the center axis direction of said operating member is made almost coincident with the lens optical axis center direction.

3. A camera according to claim 1, wherein the upper surface on which said release button is arranged of said grip for hold is inclined so as to forwardly lower relative to the lens optical axis center.

4. A camera according to claim 1, wherein said one said of the camera body on which said grip for hold is formed is the side on which the take-up spool is arranged.

5. A camera according to claim 1, wherein said release button, said dial-shaped information setting operating member and said photographic information display device are arranged in the lens optical axis central line direction.

6. A camera having an information setting device comprised of a dial-shaped information setting operating member capable upon rotation of altering photographic informations, comprising:
   (a) a grip for hold formed to a projected shape from the front surface of one side of the camera body in an optical axis center direction;
   (b) a dial-shaped information setting operating member positioned between said grip for hold and the camera body;
   (c) bearing means for said dial-shaped information setting operating member arranged within said grip for hold; and
   (d) click force bias means for said dial-shaped information setting operating member arranged within said grip for hold.

* * * * *